Jan. 31, 1950  C. H. MINER  2,496,061
VARIABLE SPEED CLUTCH PULLEY
Filed July 19, 1946

INVENTOR.
Charles H. Miner
BY
ATTORNEYS

Patented Jan. 31, 1950

2,496,061

UNITED STATES PATENT OFFICE 2,496,061

VARIABLE-SPEED CLUTCH PULLEY

Charles H. Miner, Denver, Colo.

Application July 19, 1946, Serial No. 684,940

1 Claim. (Cl. 74—230.17)

The present invention relates to variable speed pulleys and is more particularly concerned with a combined pulley and clutch to govern the speed of rotation of the belt.

The primary object of the invention is to provide a pulley of the halved type with intermediate idler means to carry the pulley belt when the pulley sections are spaced apart by diminution of the speed of the pulley shaft.

Another object of the invention is to provide a device of the character referred to which can be associated with either automatic, centrifugally controlled means or manually controlled lever means, to reduce the spacing between the pulley halves as the R. P. M. of the shaft increases.

With the foregoing and other objects and advantages in view the invention consists of the novel construction and arrangement of parts hereinafter described and claimed.

Figure 2:
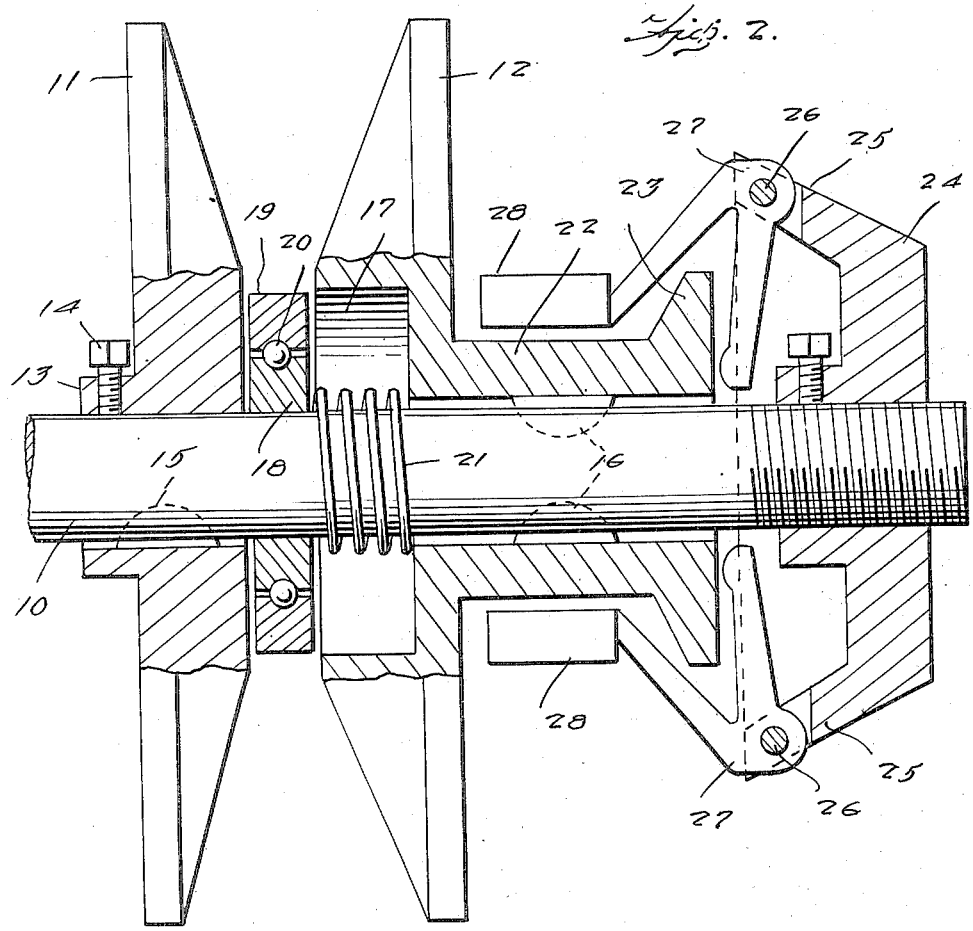
Figure 1:
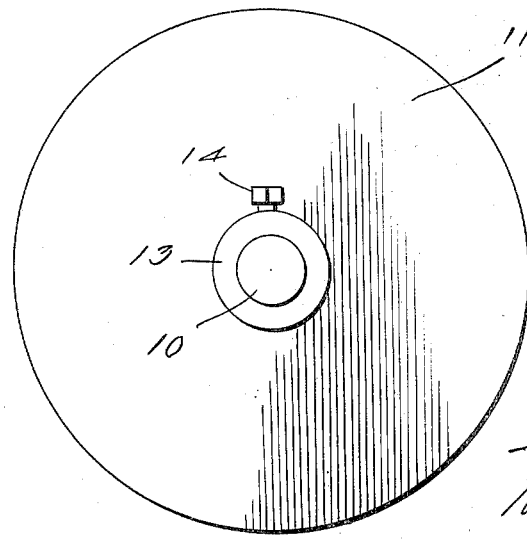

In the accompanying drawings illustrating the invention,

Figure 1 is a longitudinal section of the device in operative position on a shaft and Figure 2 is an end elevation thereof.

Like numerals, as used in the description and drawings, designate the same parts of construction.

10 refers to a pulley shaft with oppositely disposed longitudinal keyways.

Mounted on said shaft is the pulley which comprises two halves 11 and 12 with opposing conical faces. Pulley half 11 is provided with a hub 13, which is made fast to the shaft by a set screw 14 to prevent sliding, and is further secured so as to rotate therewith by a key 15 which is preferably of the Woodruff type.

The pulley half 12 is mounted on the shaft for both rotary and longitudinal movement by means of similar keys 16 which engage the oppositely disposed keyways. This half of the pulley is provided with a concentric, circular recess 17 facing the other pulley half.

Interposed between the pulley halves is an idler member which is mounted freely on the shaft and designed to carry the belt when the pulley halves are sufficiently spaced apart. This idler member consists of a concentric disc 18 and a ring 19 with a plane periphery mounted concentrically thereon, the two having ball races in their contiguous faces for ball bearings 20. The overall diameter of this idler assembly is such that it may enter recess 17 when the pulley halves are in close association.

Interposed between said idler member and the bottom of said recess is a coiled spring 21 which surrounds shaft 10.

On its opposite side the pulley half 12 is formed coaxially with an elongated hub 22 having a flange 23 on its outer extremity.

Contiguous to this end a disc member 24 is mounted fast on the shaft. It is provided with diametrically disposed, inwardly inclined and bifurcated arms 25. Mounted in each of said bifurcations by pivot pins 26 is a two-arm lever 27. One arm depends in proximity to the flanged end of hub 22 while the other, which sits at an acute angle to the depending arm, carries a weight 28. These weights, operating by centrifugal force according to the speed of shaft 10, serve to force the depending arms of the lever against hub 22 and thereby urge the pulley half 12 closer to the other half, thus overcoming the resilient spreading force of spring 21.

When the speed of rotation of the shaft is increased sufficiently to cause the said levers by centrifugal force to overcome the tension of said spring the two pulley halves will move toward each other and their opposing faces will frictionally engage the belt and gradually force same upward in the groove formed by the pulley halves.

When the speed of the shaft decreases and the pulley half 12 moves away from the half 11, the belt is thereby allowed to rest on the element 19 of the idler assembly.

The device may be applied to any machine that uses a V belt drive and clutch. It can also be adapted to a plurality of such belts, thus making it useful for large machines. It can also be used on motorscooters with good results. As it picks up speed it automatically attains a higher gear ratio.

As different embodiments may be made of this inventive concept and modifications may be made in the embodiment hereinbefore shown and described, it will be understood that the matter herein is to be interpreted as illustrative merely, and not in a limiting sense.

What I claim is:

A V-type pulley for automatically varying the effective pitch diameter in response to its changes in speed of rotation and for automatically disconnecting a driving connection with a V-belt when the pulley rotates below a predetermined speed, comprising; a rotatable shaft, a pair of axially aligned members drivingly mounted thereon and relatively movable axially and having juxtaposed frustoconical faces for receiving a V-belt therebetween, the width of the faces in a radial direction being substantially in excess of the thickness of the belt to provide for an appreciable change of effective pitch diameter, an idler pulley rotatably mounted on said shaft and disposed axially between the members, one of said members being constructed so that it may telescope over the idler pulley during axial movement thereof in one direction, resilient means for automatically moving said one member away from the other during decrease in the speed of rotation of the shaft, a centrifugal device mounted on said shaft and rotatable therewith and adapted to exert a force on said one member in opposition to the force exerted thereon by said resilient means for moving said one member toward the other during an increase in speed of rotation of the shaft, the resilient means and centrifugal device being adapted to exert balancing opposed forces to position said members in predetermined relationship at a predetermined speed of rotation of the shaft, said resilient means being adapted to move said one member a sufficient distance away from the other member below a certain speed of rotation of the shaft to a position wherein the belt is in disconnected relation to said members and resting on said idler pulley, the centrifugal device being adapted to move said one member closer to the other at a shaft speed above a certain speed to engage said members with said belt, move it still closer to the other member to disengage the belt from the idler pulley with further increase in shaft speed, and move said one member still closer to the other to provide various effective pitch diameters of the pulley upon still further increase in shaft speed.

CHARLES H. MINER.

REFERENCES CITED

The following references are of record in the file of this patent:

UNITED STATES PATENTS

| Number | Name | Date |
|---|---|---|
| 2,180,217 | Thomas | Nov. 14, 1949 |

FOREIGN PATENTS

| Number | Country | Date |
|---|---|---|
| 684,940 | Great Britain | July 27, 1906 |
| 551,872 | France | Jan. 15, 1923 |
| 435,257 | Great Britain | Sept. 18, 1935 |